(12) United States Patent
Reis et al.

(10) Patent No.: US 8,405,600 B2
(45) Date of Patent: Mar. 26, 2013

(54) METHOD FOR REDUCING TEMPERATURE-CAUSED DEGRADATION IN THE PERFORMANCE OF A DIGITAL READER

(75) Inventors: Bradley E. Reis, Westlake, OH (US); Robert Anderson Reynolds, III, Bay Village, OH (US); James T. Petroski, Parma, OH (US); Yin Xiong, Westlake, OH (US)

(73) Assignee: GrafTech International Holdings Inc., Parma, OH (US)

( * ) Notice: Subject to any disclaimer, the term of this patent is extended or adjusted under 35 U.S.C. 154(b) by 601 days.

(21) Appl. No.: 12/631,040

(22) Filed: Dec. 4, 2009

(65) Prior Publication Data

US 2011/0134106 A1 Jun. 9, 2011

(51) Int. Cl.
*G09G 3/34* (2006.01)

(52) U.S. Cl. ............ 345/107; 345/63; 345/92; 345/101; 345/213

(58) Field of Classification Search .................. None
See application file for complete search history.

(56) References Cited

U.S. PATENT DOCUMENTS

| | | |
|---|---|---|
| 3,404,061 A | 10/1968 | Shane et al. |
| 4,895,713 A | 1/1990 | Greinke et al. |
| 5,902,762 A | 5/1999 | Mercuri et al. |
| 6,269,864 B1 | 8/2001 | Kabadi |
| 6,482,520 B1 | 11/2002 | Tzeng |
| 6,673,289 B2 | 1/2004 | Reynolds, III et al. |
| 6,706,400 B2 | 3/2004 | Mercuri et al. |
| 6,982,874 B2 | 1/2006 | Smalc et al. |
| 7,166,912 B2 | 1/2007 | Tzeng et al. |
| 7,276,273 B2 | 10/2007 | Clovesko et al. |
| 7,292,441 B2 | 11/2007 | Smalc et al. |
| 7,306,847 B2 | 12/2007 | Capp et al. |
| 7,365,988 B2 | 4/2008 | Reis et al. |
| 7,385,819 B1 | 6/2008 | Shives et al. |
| 2006/0292461 A1* | 12/2006 | Shives et al. ................ 430/7 |
| 2007/0075962 A1* | 4/2007 | Zhou et al. ................ 345/107 |
| 2008/0218471 A1 | 9/2008 | Chung et al. |

FOREIGN PATENT DOCUMENTS

WO 03051772 6/2003

OTHER PUBLICATIONS

Shooshtari, A., et al., "The Impact of a Thermal Spreader on the Temperature Distribution in a Plasma Display Panel," Thermal and Thermomechanical Phenomena in Electronics Systems, May 30, 2006, pp. 395-401.

Smalc, M., et al., "Thermal Performance of Natural Graphite Heat Spreaders," Advances in Electronic Packaging. Proceedings of the Pacificrim/ASME International Intersociety Electronic and Photonicpackaging conference, Jul. 17, 2005, pp. 1-11.

* cited by examiner

*Primary Examiner* — Joseph Haley
*Assistant Examiner* — Ifedayo Iluyomade (57) ABSTRACT

A method for reducing temperature-caused degradation of the performance of a digital reader comprising pixels, the method including positioning at least one sheet of compressed particles of exfoliated graphite adjacent to a plurality of the pixels of the digital reader.

16 Claims, 4 Drawing Sheets

METHOD FOR REDUCING TEMPERATURE-CAUSED DEGRADATION IN THE PERFORMANCE OF A DIGITAL READER

BACKGROUND OF THE INVENTION

1. Technical Field

The present disclosure relates to the reduction of temperature-caused degradation in the performance of a digital reader. More specifically, the present disclosure relates to reducing the temperature-caused degradation in the performance of a digital reader, where the digital reader has an electronic display containing pixels. The reduction in performance degradation is obtained by positioning at least one sheet of compressed particles of exfoliated graphite in thermal contact with a plurality of the pixels of the electronic display in the digital reader.

2. Background Art

Digital readers are an exciting new branch of technology, allowing a user to access voluminous materials using a relatively compact and portable device. The most well-known of these devices is the Amazon Kindle™ digital reader, which professes to be able to store over 1000 books. Another device gaining popularity is the Sony e-Reader™ digital display. Digital readers each use one of several different technologies in its visual display. These technologies are sometimes referred to as electronic paper or e-paper displays.

The most common type of e-paper display technology is referred to as an electrophoretic display (EPD), and is available from companies such as E Ink Corporation and SiPix Imaging, Inc. In EPD, pixels change color in response to a change in the charge. The pixels can change from a "resting" color to a dye color, or swap between different color particles. A viscous fluid in the pixels holds the particles in their position without the use of power; thus, EPDs are bistable, that is, they are stable in either of their two positions when no power is applied, and only use power when the pixels are changed from one state to another (i.e. equivalent to "turning the page"). EPDs utilize reflective, non-emissive display technologies (i.e., they rely on ambient light or lighting from the front of the display for viewing, are not backlit, and the pixels do not emit light themselves) and because of this and EPD's bistable nature, do not use a great deal of power as compared with traditional emissive display technologies like plasma, backlit liquid crystal display (LCD), or organic light emitting diodes (OLED).

One approach for an EPD is to use spheres having two colors, which are suspended in a viscous liquid between rubbery sheets. As a charge is applied, the sphere rolls into a first position (representing one of the two colors) and then stays in place after the charge is removed. When the charge is applied again, the sphere rolls into a second position (representing the second of the two colors) and then stays in place after the charge is removed. In this way, controlling which of the pixels is exposed to the charge will control the image displayed.

Other e-paper technologies include electronic liquid powder (ELP) or quick response liquid powder display (QR-LPD), in which particles are suspended in air. The particles flow as in a particulate suspension, making this technology very sensitive to electricity and thereby fostering fast reaction. In addition, ELP and QR-LPD displays can reduce image distortion when the display medium is bent or flexed.

Other types of e-paper technologies are under development. In electrowetting displays (EWDs), water droplets on a hydrophobic surface react differently to the application of a charge. Electrochromic (EC) displays include EC display cells which are built up from the combination of a conducting polymer coated paper, a printed electrochromic polymer film, a printed electrolyte pattern and a protective seal layer. In the resulting display cell, the optical contrast is a result of the contrast between the white paper surface and the electrochromic materials switched to its colored state. Cholesteric liquid crystal displays (ChLCDs) and bistable nematic LCDs are two additional technologies being developed for digital readers. Glass-based display using micro-electro-mechanical system (MEMS) technology utilize a reflective technology called IMOD (Interferometric MODulation), with MEMS structures at its core; they use light interference for color generation. Photonic Crystals (P-Ink) are small artificial opals which can change color by electrical stimulation. These opals are integrated into a layer of millions of tiny spheres, which are embedded into an electroactive polymer. By applying a controlled current, the crystals can be maneuvered to produce the entire light spectrum.

Each of the e-paper display systems disclosed herein can be generally defined as a non-emissive display which utilizes a plurality of fluid-containing pixels, with many of these e-paper display systems also being bistable, which require no power to maintain them in either of their two states. Additionally, for a high resolution e-paper display, a thin film transistor (TFT) backplane is typically necessary to drive the pixels. A TFT is a specific type of field-effect transistor produced by depositing thin films of a semiconductor active layer as well as a dielectric layer and metallic contacts over a supporting substrate. A common substrate is glass, since the primary application of TFTs is in liquid crystal displays, but the substrate may also be plastic, lending itself ultimately toward flexible e-paper displays.

One issue facing e-paper displays is exposure to temperature extremes, whether high temperatures, especially temperatures in excess of 35° C., or low temperatures, especially temperatures below 20° C. These temperatures can be experienced if, for example, the digital reader containing the e-paper display is left in a vehicle on a hot or cold day, respectively. High temperatures can cause image ghosting, which occurs when an image is retained even after the display is changed. Low temperatures can lead to delayed response time for the display. In addition, as more functionality is added to digital readers, such as internet connectivity, other heat sources are placed in close proximity to the display and thermal issues are expected to worsen. While the reason for these thermally-induced effects is not fully understood, one theory is that the extremes in temperature lead to changes in fluid viscosity, and the changes in fluid viscosity in turn cause the disadvantageous effects; another theory is that the TFTs themselves are very temperature sensitive, leading to noticeable visual artifacts when non-uniform temperature gradients are induced on the e-paper display.

Accordingly, what is sought is a method for avoiding or reducing the temperature-caused degradation in the performance of an e-paper display in a digital reader, whether it takes the form of delayed response or ghosting, or other thermally-induced issues, and a digital reader for which such degradation is reduced.

Graphite flake which has been greatly expanded and more particularly expanded so as to have a final thickness or "c" direction dimension which is as much as about 80 or more times the original "c" direction dimension can be formed without the use of a binder into cohesive or integrated sheets of expanded graphite, e.g. webs, papers, strips, tapes, foils, mats or the like (typically referred to commercially as "flexible graphite"). The formation of graphite particles which have been expanded to have a final thickness or "c" dimension which is as much as about 80 times or more the original "c" direction dimension into integrated flexible sheets by compression, without the use of any binding material, is believed to be possible due to the mechanical interlocking, or cohesion, which is achieved between the voluminously expanded graphite particles.

In addition to flexibility, the sheet material, as noted above, has also been found to possess a high degree of anisotropy with respect to thermal conductivity due to orientation of the expanded graphite particles and graphite layers substantially parallel to the opposed faces of the sheet resulting from high compression, making it especially useful in heat spreading applications. Sheet material thus produced has excellent flexibility, good strength and a high degree of orientation.

The flexible graphite sheet material exhibits an appreciable degree of anisotropy due to the alignment of graphite particles parallel to the major opposed, parallel surfaces of the sheet, with the degree of anisotropy increasing upon compression of the sheet material to increase orientation. In compressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal and electrical properties of the sheet are very different, by orders of magnitude, for the "c" and "a" directions.

BRIEF DESCRIPTION

The present disclosure relates to a method for reducing temperature-caused degradation of the performance of a digital reader, where the digital reader has an e-paper display with pixels. The method involves positioning at least one sheet of compressed particles of exfoliated graphite so as to be adjacent to, or, preferably, in thermal contact with, a plurality of the pixels of the e-paper display. The at least one sheet of compressed particles of exfoliated graphite advantageously has a thermal anisotropic ratio of at least about 70, and, in certain embodiments, a density of at least about 1.1 g/cc, more preferably a density of at least about 1.6 g/cc. Moreover, in some embodiments, the at least one sheet of compressed particles of exfoliated graphite has a thickness of no more than about 0.5 mm. Depending on the nature of the e-paper display and/or the TFT substrate, the at least one sheet of compressed particles of exfoliated graphite and the e-paper display can be bent around a radius of no less than 5 mm while still remaining functional (i.e., the e-paper display still functions and the sheet of compressed particles of exfoliated graphite does not experience significant reduction of its thermal properties).

The digital reader contains an e-paper display. More particularly, in some embodiments, the digital reader has an e-paper display selected from the group consisting of an electrophoretic display, an electrowetting display, an electrochromic display, a cholesteric liquid crystal display, a bistable nematic liquid crystal display, a micro-electro-mechanical system display or a photonic crystal display. In many embodiments, the e-paper display is bistable.

In certain circumstances, in the preferred embodiments, the response time of any one of the pixels in the plurality of pixels to which the at least one sheet of compressed particles of exfoliated graphite is adjacent is no more than twice that of any other pixel in the plurality of pixels. In other embodiments, the temperature of the majority of the pixels of the e-paper display in the digital reader to which the at least one sheet of compressed particles of exfoliated graphite is adjacent is sufficiently high such that the response time of such pixels at ambient conditions of 10° C. is within 50% of the response time of such pixels at ambient conditions of 20° C., and more preferably, within 10% of the response time of such pixels at ambient conditions of 20° C. Contrariwise, in certain circumstances, in the preferred embodiments, the temperature of the majority of the pixels of the e-paper display in the digital reader to which the at least one sheet of compressed particles of exfoliated graphite is adjacent is sufficiently low such that image ghosting is reduced as compared to a corresponding digital reader without the at least one sheet of compressed particles of exfoliated graphite. Ultimately, in advantageous embodiments, the temperature difference between individual pixels of the majority of the pixels of the digital reader to which the at least one sheet of compressed particles of exfoliated graphite is adjacent is no more than 5° C.; also, in advantageous embodiments, the response time difference between individual pixels of the plurality of the pixels to which the at least one sheet of compressed particles of exfoliated graphite is adjacent is no more than 50%, and more preferably, no more than 10%.

In certain embodiments, the method of the present disclosure involves increasing the temperature of a plurality of pixels of the e-paper display in the digital reader in order to maintain the temperature of such pixels sufficiently high such that temperature of such pixels at ambient conditions of 10° C. is within 25% of the temperature of such pixels at ambient conditions of 20° C., and more preferably within 10%, by transferring heat from a heat source which is not part of the e-paper display (such as the digital reader's wireless module, multimedia processor, etc.) to such pixels. While the precise mechanism for this is not fully understood, it is believed the response time of the pixels is improved by changing the viscosity of the fluid in the pixels, more specifically by reducing the viscosity of the fluid in the pixels.

It is to be understood that both the foregoing general description and the following detailed description present embodiments of the invention and are intended to provide an overview or framework for understanding the nature and character of the invention as it is claimed. The accompanying drawings are included to provide a further understanding of the invention and are incorporated in and constitute a part of this specification. The drawings illustrate various embodiments of the invention and together with the description serve to explain the principles and operations of the invention. Other and further features and advantages of the present invention will be readily apparent to those skilled in the art upon a reading of the following disclosure when taken in conjunction with the accompanying drawings.

DETAILED DESCRIPTION OF THE PREFERRED EMBODIMENTS

As noted, reducing temperature-caused degradation of the performance of an e-paper display in a digital reader, in accordance with the disclosure hereof, involves positioning at least one sheet of compressed particles of exfoliated graphite adjacent to a plurality of the pixels of the display, more preferably adjacent to a majority of the pixels of the display. In the preferred embodiments, the at least one sheet of compressed particles of exfoliated graphite is adjacent to all of the pixels of the e-paper display. In other advantageous embodiments, the at least one sheet of compressed particles of exfoliated graphite is in thermal contact with a plurality of the pixels of the display. In the most preferred embodiments, the at least one sheet of compressed particles of exfoliated graphite in thermal contact with a majority of the pixels of the display, and even all of the pixels of the e-paper display. While the preferred embodiments are written in terms of the use of one sheet of compressed particles of exfoliated graphite, in some embodiments, the use of a plurality of sheets of compressed particles of exfoliated graphite, generally up to about 10 or more sheets (and, thus, described herein as "at least one sheet of compressed particles of exfoliated graphite") is within the contemplation of the disclosure.

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes.

The graphite starting materials used to provide the heat spreader in the present disclosure may contain non-graphite components so long as the crystal structure of the starting materials maintains the required degree of graphitization and they are capable of exfoliation. Generally, any carbon-containing material, the crystal structure of which possesses the required degree of graphitization and which can be exfoliated, is suitable for use with the present invention. Such graphite preferably has a purity of at least about eighty weight percent. More preferably, the graphite employed for the heat spreader of the present invention will have a purity of at least about 94%. In the most preferred embodiment, the graphite employed will have a purity of at least about 98%.

Compressed exfoliated graphite materials, such as graphite sheet and foil, are coherent, with good handling strength, and are suitably compressed, e.g. by roll pressing, to a thickness of about 0.05 mm to 3.75 mm and a typical density of about 0.4 to 2.0 g/cc or higher. Indeed, in order to be consider "sheet," the graphite should have a density of at least about 0.6 g/cc, and to have the flexibility required for the present invention, it should have a density of at least about 1.1 g/cc, more preferably at least about 1.6 g/cc. While the term "sheet" is used herein, it is meant to also include continuous rolls of material, as opposed to individual sheets.

If desired, sheets of compressed particles of exfoliated graphite can be treated with resin and the absorbed resin, after curing, enhances the moisture resistance and handling strength, i.e. stiffness, of the graphite article as well as "fixing" the morphology of the article. Suitable resin content is preferably at least about 5% by weight, more preferably about 10 to 35% by weight, and suitably up to about 60% by weight. Resins found especially useful in the practice of the present invention include acrylic-, epoxy- and phenolic-based resin systems, fluoro-based polymers, or mixtures thereof. Suitable epoxy resin systems include those based on diglycidyl ether of bisphenol A (DGEBA) and other multifunctional resin systems; phenolic resins that can be employed include resole and novolac phenolics. Optionally, the flexible graphite may be impregnated with fibers and/or salts in addition to the resin or in place of the resin. Additionally, reactive or non-reactive additives may be employed with the resin system to modify properties (such as tack, material flow, hydrophobicity, etc.).

As noted above, the current disclosure relates to the use of a sheet of compressed particles of exfoliated graphite. The graphite sheet should have a density of at least about 0.6 g/cc, more preferably at least about 1.1 g/cc, most preferably at least about 1.6 g/cc. From a practical standpoint, the upper limit to the density of the graphite sheet heat spreader is about 2.0 g/cc. The sheet should be no more than about 10 mm in thickness, more preferably no more than about 2 mm and most preferably not more than about 0.5 mm in thickness. When more than one sheet is employed, the total thickness of the sheets taken together should preferably be no more than about 2 mm.

In certain embodiments, a plurality of graphite sheets may be laminated into a unitary article for use in the method disclosed herein, provided the laminate meets the density and thickness requirements set forth hereinabove. The sheets of compressed particles of exfoliated graphite can be laminated with a suitable adhesive, such as pressure sensitive or thermally activated adhesive, therebetween. The adhesive chosen should balance bonding strength with minimizing thickness, and be capable of maintaining adequate bonding at the service temperature at which heat transfer is sought. Suitable adhesives would be known to the skilled artisan, and include acrylic and phenolic resins.

The graphite sheet(s) should have a thermal conductivity parallel to the plane of the sheet (referred to as "in-plane thermal conductivity") of at least about 140 W/m-K for effective use. More advantageously, the thermal conductivity parallel to the plane of the graphite sheet(s) is at least about 220 W/m-K, most advantageously at least about 300 W/m-K. From a practical standpoint, sheets of compressed particles of exfoliated graphite having an in-plane thermal conductivity of up to about 600 W/m-K are all that are necessary.

In addition to the in-plane thermal conductivity of the sheet(s) of compressed particles of exfoliated graphite, the through-plane thermal conductivity is also relevant. More particularly, the anisotropic ratio of the sheet (as defined hereinbelow) is relevant. In certain embodiments, the through-plane thermal conductivity of the sheet of compressed particles of exfoliated graphite should be less than about 12 W/m-K; in other embodiments, the through-plane thermal conductivity is less than about 10 W/m-K. In still other embodiments, the through-plane thermal conductivity of the sheet of compressed particles of exfoliated graphite is less than about 7 W/m-K. Generally, the through-plane thermal conductivity of the sheet is at least about 1.5 W/m-K.

The expressions "thermal conductivity parallel to the plane of the sheet" and "in-plane thermal conductivity" refer to the fact that a sheet of compressed particles of exfoliated graphite has two major surfaces, which can be referred to as forming the plane of the sheet; thus, "thermal conductivity parallel to the plane of the sheet" and "in-plane thermal conductivity" constitute the thermal conductivity along the major surfaces of the sheet of compressed particles of exfoliated graphite. The expression "through-plane thermal conductivity" refers to the thermal conductivity between the major surfaces of the sheet.

In order to access the anisotropic properties of the graphite sheet, the anisotropic ratio of the sheet should be at least about 50; in other embodiments, the anisotropic ratio of the sheet is at least about 70. Generally, the anisotropic ratio need not be any greater than about 250. The anisotropic ratio is calculated by dividing the in-plane thermal conductivity by the through-plane thermal conductivity. Thus, a sheet of compressed particles of exfoliated graphite having an in-plane thermal conductivity of 350 W/m-K and a through-plane thermal conductivity of 5 W/m-K has a thermal anisotropic ratio of 70.

As noted, the temperature-caused degradation of the performance of an e-paper display in a digital reader, where the display has fluid-containing pixels, is reduced by positioning at least one sheet of compressed particles of exfoliated graphite adjacent to a plurality of the pixels of the e-paper display. In the preferred embodiments, the least one sheet of compressed particles of exfoliated graphite is positioned in thermal contact with a plurality of the pixels of the e-paper display. By "thermal contact" is meant that there is measurable thermal transfer between the pixels and the graphite sheet, and vice versa. In some embodiments, the graphite sheet is in thermal contact with at least 40% of the pixels of the display; in a preferred embodiment, the sheet of compressed particles of exfoliated graphite is in thermal contact with a majority of the pixels, i.e., at least 50% of the pixels of the display. In the preferred embodiment, the sheet of graphite is in thermal contact with at least 70% of the pixels, and most preferable 100% of the pixels of the e-paper display of the digital reader.

In addition to the characteristics described above, depending on the nature of the digital reader and/or the TFT substrate, the at least one sheet of compressed particles of exfoliated graphite and the display can be bent around a radius of no less than 5 mm while still remaining functional. In other words, certain e-paper display technology provides for a flexible display, the advantages of which would be apparent to the skilled artisan. In these cases, a flexible graphite sheet can be maintained in position, even while the display is flexed.

In the preferred embodiments, the uniformity of the response time of an e-paper display for a digital reader is improved by the practice of the present disclosure, where at least one sheet of compressed particles of exfoliated graphite having a density of at least about 1.1 g/cc is positioned adjacent to a plurality of fluid-containing pixels of an e-paper display and a heat source in thermal connection with at least some of the pixels in the plurality of pixels; as a result, the response time of any one of the pixels in the plurality of pixels is no more than twice that of any other pixel in the plurality of pixels. More preferably, the response time of any of the pixels is not more than 50% greater than that of any other of the pixels.

In other embodiments, when the pixels of the display are adjacent to or in thermal connection with a sheet of compressed particles of exfoliated graphite, the temperature of the pixels is maintained sufficiently high such that response time of the pixels is not more than 10% less than the room temperature response time of the pixels, even at a temperature of 20° C. or lower. This can be accomplished, for instance, by transferring heat from a heat source which is not part of the display, to the pixels to thereby raise their temperature. The heat source can be part of the digital reader such as a circuit, hard drive, a power amplifier, wireless card, battery or light source, or combinations of the foregoing, or external to the digital reader, such heat from the user's hands, etc. As would be readily apparent, the sheet of compressed particles of exfoliated graphite should be in thermal contact with the heat source in addition to the pixels, in order to accomplish this heat transfer.

In addition, in embodiments, the temperature of the pixels of the e-paper display with which the sheet of compressed particles of exfoliated graphite is in thermal contact is maintained such that image ghosting is reduced as compared to a corresponding display without the sheet of compressed particles of exfoliated graphite, even when the display is exposed to a temperature of 35° C. or higher. Ultimately, in advantageous embodiments, the temperature difference between individual pixels of the e-paper display with which the graphite sheet is in thermal contact is no more than 5° C.

In still other embodiments, thermal contact between the sheet of compressed particles of exfoliated graphite and pixels of the e-paper display of the digital reader leads to an increase in the temperature of some of the pixels and a decrease in the temperature of other pixels, depending on the pixels' relative location vis-à-vis an area of relatively higher or lower temperature. In other words, in situations where different pixels are exposed to different temperatures, with some pixels exposed to higher temperatures than others and some pixels exposed to lower temperatures than others, the use of a sheet of compressed particles of exfoliated graphite in thermal contact with the pixels can reduce the temperature differential between pixels. Advantageously, in this manner, the temperature difference between individual pixels of the display with which the graphite sheet is in thermal contact is no more than 5° C.

Figure 1:
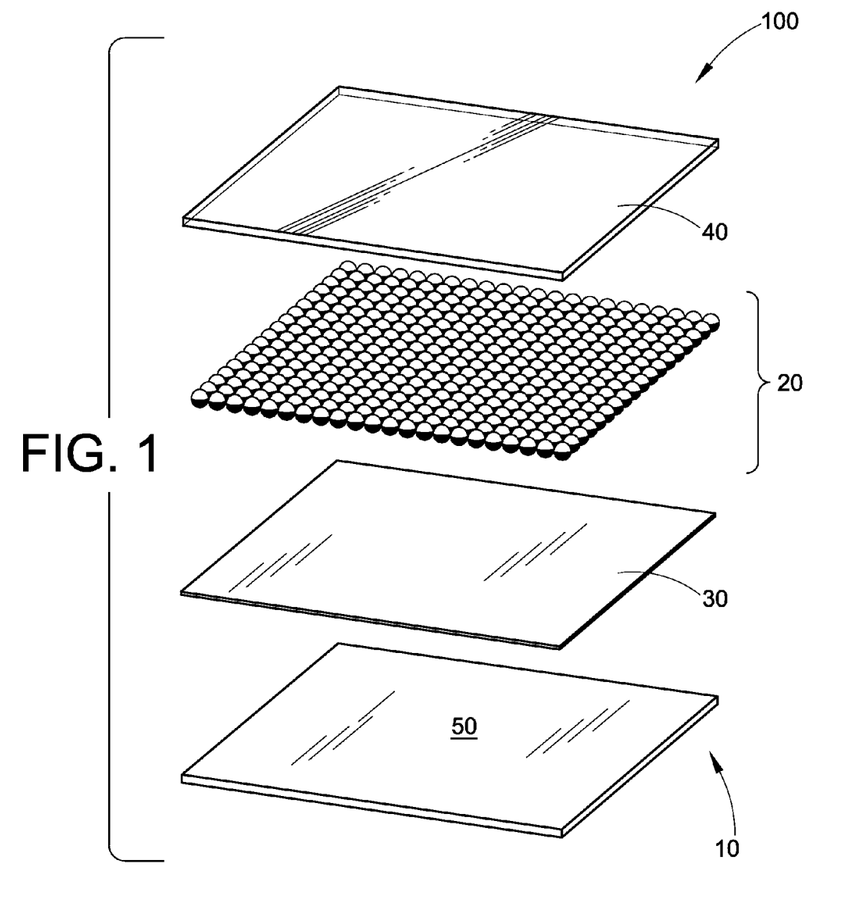
FIG. 1 is a partial exploded cross-sectional schematic view of one embodiment of an e-paper display in accordance with the present disclosure.
Figure 2:
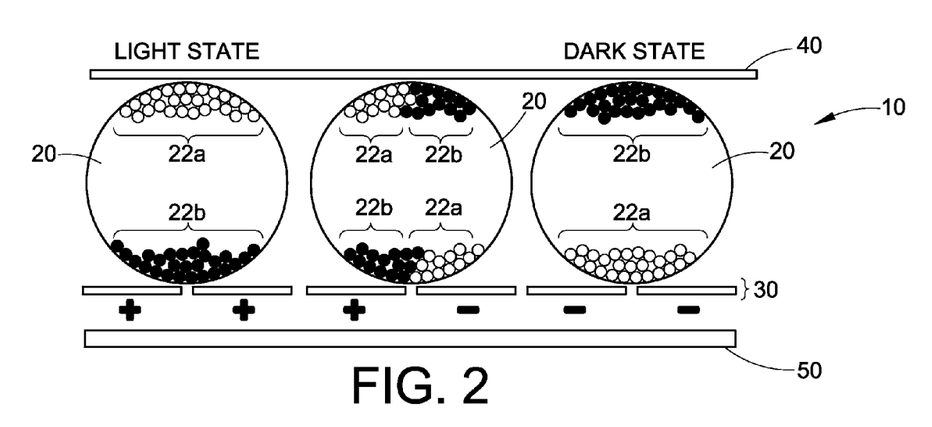
FIG. 2 is a partial cross-sectional schematic view of the display of FIG. 1, having a sheet of compressed particles of exfoliated graphite adjacent to the pixels thereof.

Turning now to the drawings, a digital reader in accordance with the present disclosure is denoted by reference numeral 100. As shown in FIGS. 1-5, digital reader 100 includes an electronic paper (or e-paper) display 10, which includes a plurality of pixels 20. Pixels 20 have fluid therewithin, as well as charged particles 22; as shown in FIGS. 2 and 5, negatively charged particles 22a are pigmented white whereas positively charged particles 22b are pigmented black, although the relationship between the specific charged particles and the pigments are for illustration purposes and different e-paper displays can employ different conventions.

E-paper display 10 also includes an electrode 30 and 30, respectively, which can selectively produce positive and negative charges, corresponding to the image to be displayed. In other words, electrode 30 has different zones, each of which is capable of having a positive or a negative charge different from other zones, such that the arrangement of charges in electrode 30 can interact with pixels 20 to cause pixels 20 to assume a state such that a particular image (such as a page of text) is displayed. A transparent electrode 40 is positioned atop pixels 20 and forms the lens through which a reader views display 10.

Figure 5:
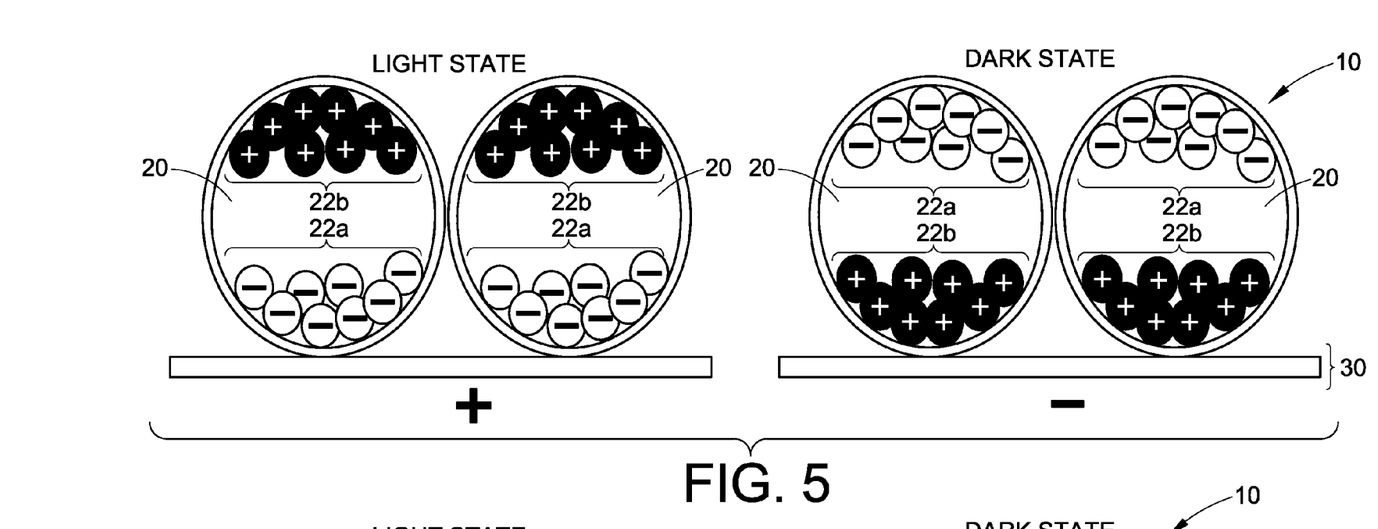
FIG. 5 is a visual representation of fluid-containing pixels of the display of FIG. 1, showing the arrangement of charged particles in the two bistable states of the pixels.
Figure 6:
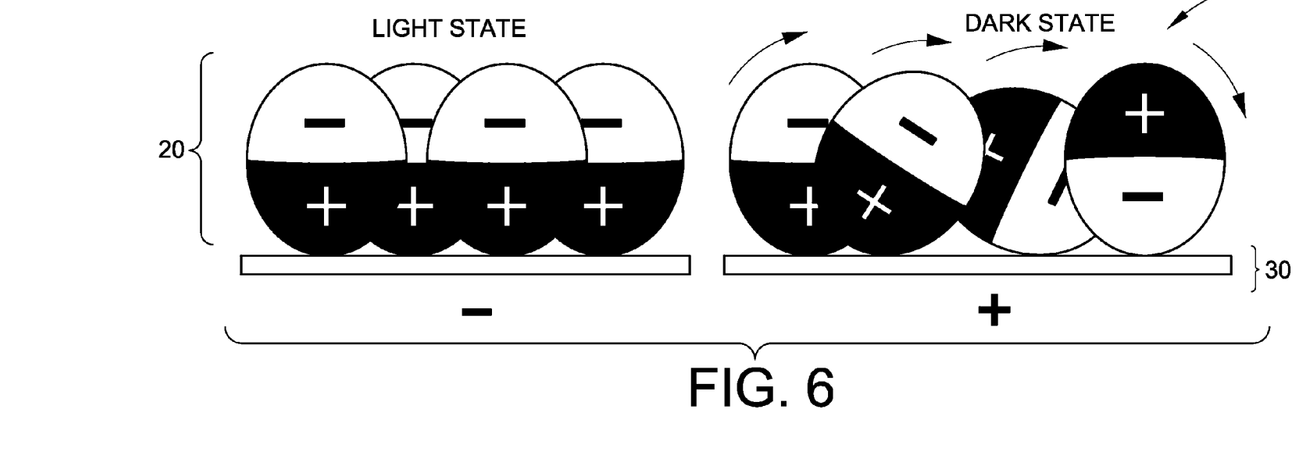
FIG. 6 is a visual representation of fluid-containing pixels of the display of FIG. 1, illustrating the re-arrangement of charged particles between the two bistable states of the pixels.

This is more easily understood with reference to FIGS. 5 and 6. As seen in FIG. 5, when a zone of electrode 30 is positive, negative charged particles 22a are attracted to electrode 30 and positive charged particles 22b are forced away from electrode 30; contrariwise, when a zone of electrode 30 is negative, positive charged particles 22b are attracted to electrode 30 and negative charged particles 22a are forced away from electrode 30. In this way, the charge in zones of electrode 30 can be used to arrange the charged particles of pixels 20 is display an image based on the pigment of the charged particles. Thus, as shown in FIG. 6, as the charge in a zone of display 10 changes from negative to positive, pixels 20 "rotate" or otherwise align such that positively charged particles move from adjacent electrode 30 to away from electrode 30, and negatively charged particles move from positioned away from electrode 30 to adjacent electrode 30, thereby changing the image in that particles zone from white to dark. In this way, the image displayed by e-paper display 10 changes, but only in response to a change in the charge state of electrode 30.

Figure 3:
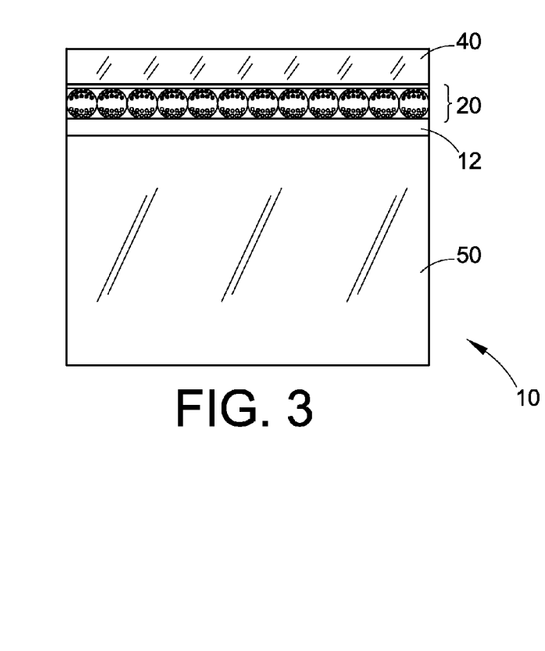
FIG. 3 is a partial cross-sectional view of one embodiment of the display of FIG. 1, including a TFT substrate.
Figure 4:
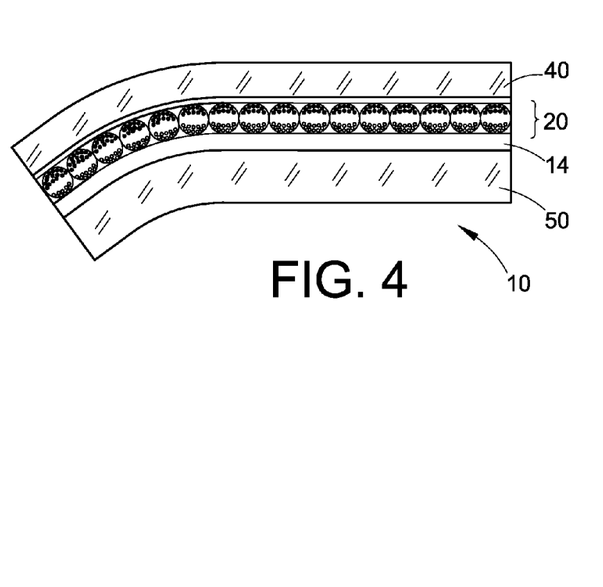
FIG. 4 is a partial cross-sectional view of another embodiment of the display of FIG. 1, including a flexible substrate.

As illustrated in FIGS. 3 and 4, the electrode of display 10 can include a TFT backplane 12 or a flexible backplane 14, or indeed, any suitable backplane, and be within the scope of the present disclosure.

Figure 7:
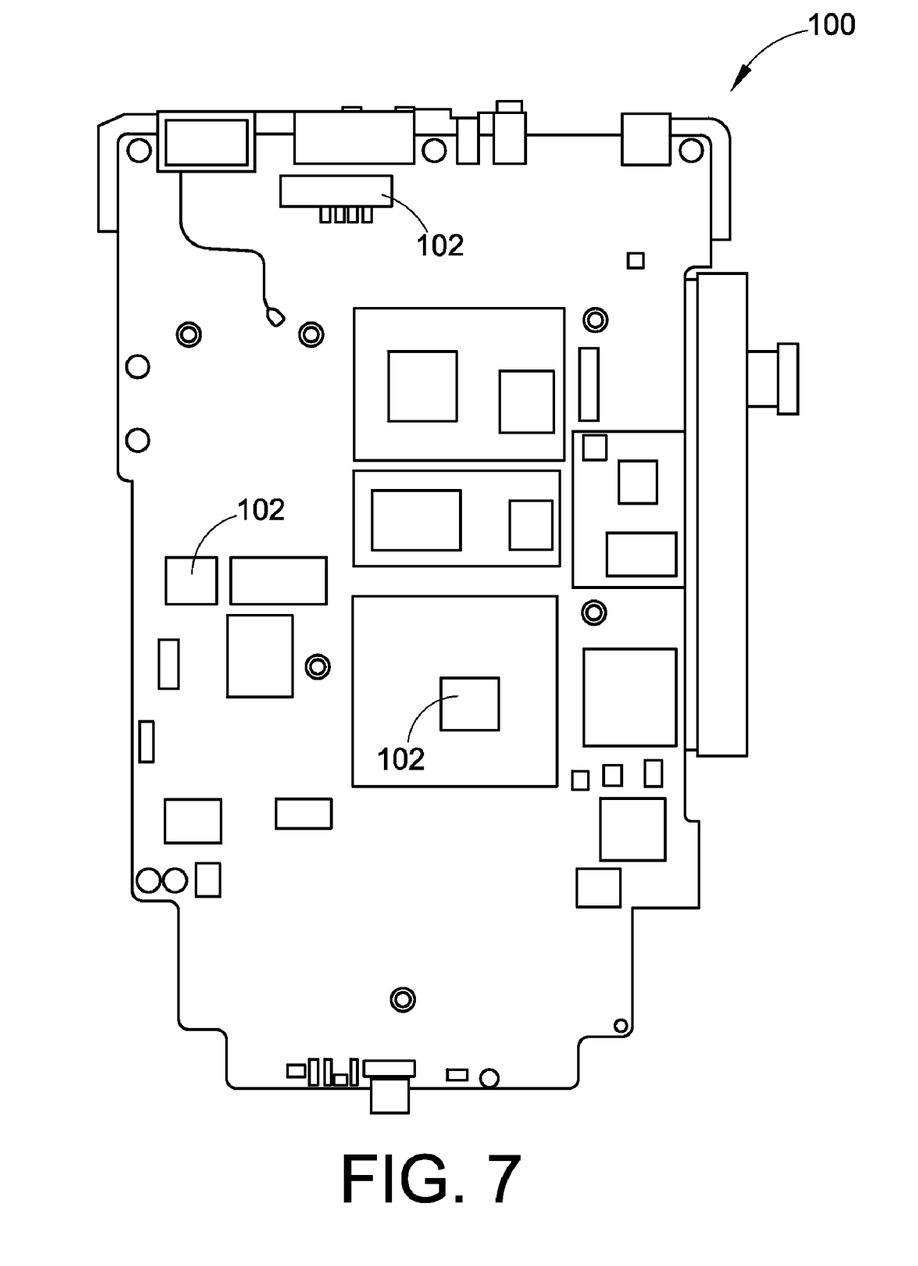
FIG. 7 provides a top plan view of the interior back panel of a digital reader, including electronic components which can act as heat sources.

In order to improve the response time uniformity, or other display characteristics as described above, at least one sheet of compressed particles of exfoliated graphite, denoted 50, is positioned adjacent to and, preferably, in thermal contact with pixels 20, as shown in FIGS. 1-4. Graphite sheet 50 serves to moderate the response time of pixels 20 to ensure greater uniformity or reduced thermally-caused performance degradation. In addition, graphite sheet 50 can also transfer heat from a heat source which is not part of display 10, to pixels 20 to thereby raise their temperature. As shown in FIG. 7, the heat source can be a component 102 of digital reader 100 such as a circuit, hard drive, a power amplifier, wireless card, battery or light source, or combinations of the foregoing.

Thus, by the practice of the method of the present disclosure, the operation of a digital reader can be improved, either in terms of response time or in terms of reduction of ghosting, or both, in an efficacious and advantageous manner.

All cited patents and publications referred to in this application are incorporated by reference.

The invention thus being described, it will be apparent that it may be varied in many ways. Such variations are not to be regarded as a departure from the spirit and scope of the present invention and all such modifications as would be obvious to one skilled in the art are intended to be included in the scope of the following claims.

What is claimed is:

1. A method for improving the uniformity of the response time of an e-paper display for a digital reader, the method comprising providing a e-paper display which comprises fluid-containing pixels, positioning at least one sheet of compressed particles of exfoliated graphite having a density of at least about 1.1 g/cc adjacent to a plurality of pixels of the e-paper display and a heat source in thermal contact with at least some of the pixels in the plurality of pixels, such that the response time of any one of the pixels in the plurality of pixels is no more than twice that of any other pixel in the plurality of pixels, wherein the temperature difference between individual pixels of the majority of the pixels which the at least one sheet of compressed particles of exfoliated graphite is positioned adjacent to is no more than 5° C.

2. The method of claim 1, wherein the e-paper display is selected from the group consisting of an electrophoretic display, an electrowetting display, an electrochromic display, a cholesteric liquid crystal display, a bistable nematic liquid crystal display, a micro-electro-mechanical system display and a photonic crystal display.

3. The method of claim 1, wherein the e-paper display is bistable.

4. The method of claim 1, wherein the at least one sheet of compressed particles of exfoliated graphite is in thermal connection with a majority of the pixels of the e-paper display.

5. The method of claim 1, wherein the at least one sheet of compressed particles of exfoliated graphite has a thermal anisotropic ratio of at least about 70.

6. The method of claim 1, wherein the at least one sheet of compressed particles of exfoliated graphite has a thickness of no more than about 0.5 mm.

7. The method of claim 1, wherein the temperature of the majority of the pixels of the e-paper display which the at least one sheet of compressed particles of exfoliated graphite is adjacent to is sufficiently high such that response time of the pixels is not more than 10% less than the room temperature response time of the pixels.

8. The method of claim 1, wherein the temperature of the majority of the pixels of the e-paper display which the at least one sheet of compressed particles of exfoliated graphite is adjacent to is sufficiently low such that image ghosting is reduced as compared to a corresponding e-paper display without the at least one sheet of compressed particles of exfoliated graphite.

9. A method for improving the response time of one or more of the fluid-containing pixels of an e-paper display for a digital reader comprising:
  a. positioning at least one sheet of compressed particles of exfoliated graphite having a density of at least about 1.1 g/cc in thermal connection with one or more of the pixels of the electronic display and a heat source located within the digital reader,
  b. raising the temperature of the pixel such that the viscosity of the fluid in the pixel changes, resulting in a change to the response time of the pixel,
  wherein the e-paper display comprises a thin film transistor substrate and further wherein the temperature difference between individual pixels of the majority of the pixels of the e-paper display in the digital reader which the at least one sheet of compressed particles of exfoliated graphite is adjacent to is no more than 5° C.

10. The method of claim 9, wherein the e-paper display comprises a bistable display.

11. The method of claim 9, wherein the e-paper display is selected from the group consisting of an electrophoretic display, an electrowetting display, an electrochromic display, a cholesteric liquid crystal display, a bistable nematic liquid crystal display, a micro-electro-mechanical system display and a photonic crystal display.

12. The method of claim 9, wherein the at least one sheet of compressed particles of exfoliated graphite having a density of at least about 1.1 g/cc in thermal connection with a majority of the pixels of the electronic display.

13. A digital reader having a display comprising pixels, comprising at least one sheet of compressed particles of exfoliated graphite having a density of at least about 1.1 g/cc positioned in thermal connection with a majority of the pixels of the digital reader, wherein the temperature difference between individual pixels of the majority of the pixels of the digital reader with which the at least one sheet of compressed particles of exfoliated graphite is in thermal connection is no more than 5° C.

14. The digital reader of claim 13, wherein the at least one sheet of compressed particles of exfoliated graphite has a thermal anisotropic ratio of at least about 70.

15. The digital reader of claim 13, which comprises a bistable display which requires no power to maintain it in either of its two bistable states, and which utilize pixels having a fluid therein.

16. The digital reader of claim 15, wherein the at least one sheet of compressed particles of exfoliated graphite is in thermal contact with a heat source which is not part of the display of the digital reader.

* * * * *